United States Patent Office 3,219,960
Patented Nov. 23, 1965

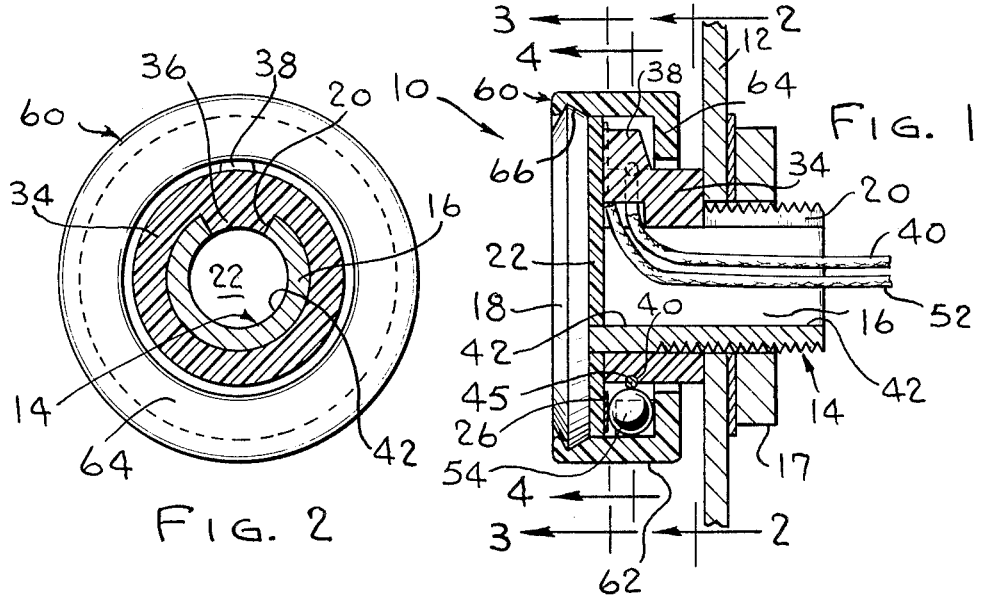
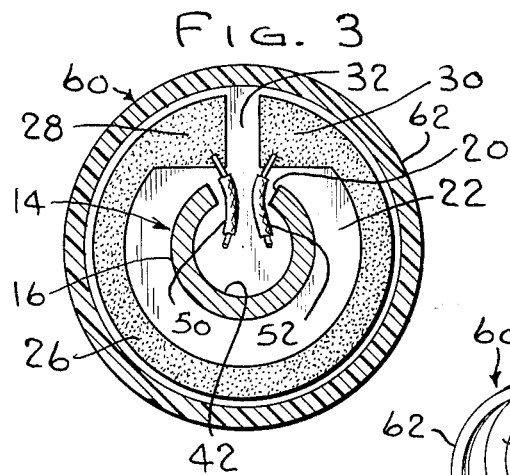
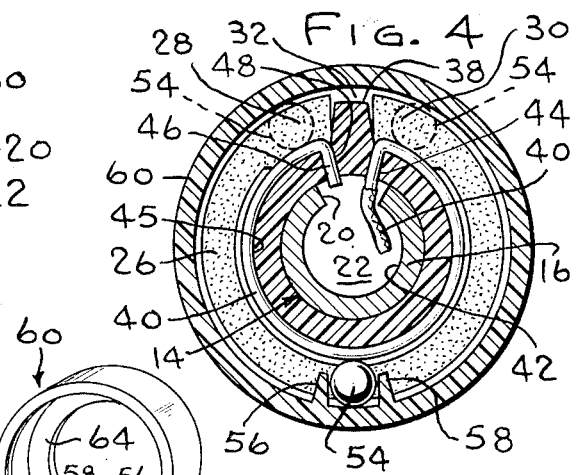
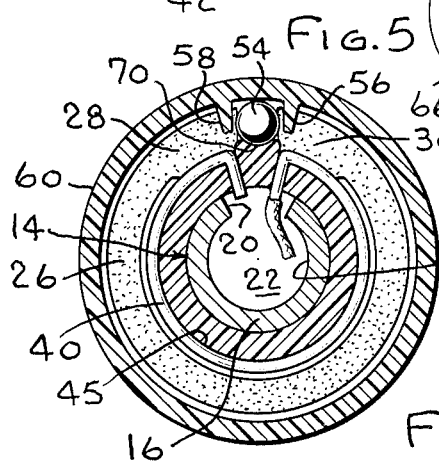
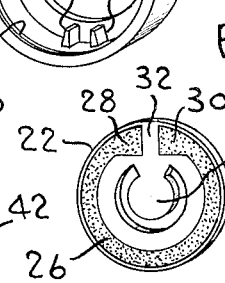
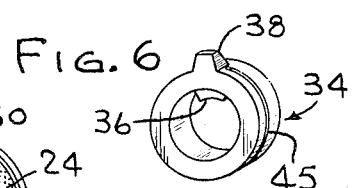

3,219,960
VARIABLE RESISTANCE DEVICE
Willy B. Volkmann, Milwaukee, Wis., assignor to Globe-Union Inc., Milwaukee, Wis., a corporation of Delaware
Filed May 28, 1962, Ser. No. 198,321
13 Claims. (Cl. 338—157)

This invention relates to variable resistance devices.

An object of this invention is to provide a variable resistance device having a construction which is simplified, economical and facilitates assembly.

Another object of this invention is to provide a variable resistance device having a minimum number of component parts.

A further object of this invention is to provide a variable resistance device incorporating a rolling contact and maintaining effective contact pressure without the use of auxiliary spring mechanisms.

For the achievement of these and other objects, this invention contemplates the provision of a variable resistance device wherein a rolling contact is engaged between a resistance element and a terminal wire. A resilient member is supported in the variable resistance device so as to form a portion of the outer housing thereof and to be rotatable relative to the resistance element and the terminal wire. The rolling contact is engaged by the resilient member and is movable, in response to movement of said resilient member, along the reistance element and the terminal wire with the resilient member biasing the rolling contact into engagement between the resistance element and the terminal to maintain desired contact pressure.

Other objects and advantages will be pointed out in, or be apparent from, the specification and claims, as will obvious modifications of the embodiments shown in the drawings, in which:

FIG. 1 is an axial section view;
FIG. 2 is a section view along line 2—2 of FIG. 1;
FIG. 3 is a section view along line 3—3 of FIG. 1;
FIG. 4 is a section view along line 4—4 of FIG. 1;
FIG. 5 is a perspective view of the cap of the device;
FIG. 6 is a perspective view of the center terminal and rolling contact support;
FIG. 7 is a perspective view of the resistance plate; and
FIG. 8 is a view similar to FIG. 4 and illustrates an alternative embodiment.

With particular reference to the drawings, variable resistance device 10 is supported on a suitable mounting panel 12 and includes a bushing 14 having a hollow tubular portion 16 and a flange portion 18. Tubular portion 16 is threaded to receive nut 17 for connecting device 10 to mounting panel 12 and is also provided with a longitudinally extending slot 20 which, as will be more fully discussed hereinafter, facilitates the assembly of the device.

A resistance carrying plate 22 is positioned on bushing 14 adjacent flange portion 18 and has a concentric slot defining a key-hole portion 24 which mates with groove 20 and bore 42 of the bushing to hold the resistance plate against rotation on the bushing. Resistance carrying plate 22 is preferably made of suitable electrical insulating material and is provided with a generally annular resistance element 26 having its ends 28 and 30 disposed in spaced relation to provide a resistance free area 32 therebetween. Resistance element 26 can be formed on plate 22 in any suitable well known manner.

A cylindrical body 34 is positioned on the bushing in abutting relationship with the resistance carrying plate and includes an inner projection 36 which fits into and conforms to slot 20 so that body portion 34 is held against rotation relative to the bushing. Body 34 also includes an outer projection 38 so positioned on the body that, when the body is assembled on the bushing adjacent the resistance plate, it is positioned at area 32. As will be more fully discussed hereinafter, projection 38 provides a positive indication when the movable contact has reached either end of its travel.

A plurality of terminal leads extend through bore 42 of the bushing for connection in the resistance element. More particularly, a conductive lead 40 extends through an aperture 44 in body 34 and around the outer circumference thereof in a groove 45. End 46 of lead 40 is turned down into opening 48 in the insulating body to anchor the lead on the body. Lead 40 provides the center lead of the variable resistance device and it will be noted that it is adjacent to and extends substantially coextensively with resistance element 26. Leads 50 and 52 are connected to ends 28 and 30 of resistance element 26 and provide end leads for the device completing a well known variable resistance circuit having a center lead and two end leads, such circuits being particularly well suited for use in volume controls. It should be noted that leads 40, 50 and 52 extend axially through and terminate externally of the bushing so as to also form the terminals for the device thereby eliminating the need for rigid terminals which would require additional jumper wires to complete connection in a particular circuit. Leads 40, 50 and 52 can be directly connected into a circuit or to particular electrical apparatus and, in extending exteriorly of the bushing, position the solder points at a sufficient distance from the resistance to prevent undue conduction of heat back to the resistance which would interfere with good electrical contact.

Electrical connection between center terminal 40 and resistance element 26 is established by rolling contact 54, preferably in the form of a ball. A cap 60 is supported from flange portion 18 and includes an annular portion 62 and a radially inwardly extending flange 64 for enclosing the resistance, center terminal and rolling contact. A groove 66 in the cap engages the peripheral edge of the flange portion 18 so that the cap is supported for rotational movement relative to the resistance element and the center terminal. Cap 60 also includes projections 56 and 58 which engage contact 54 so that the contact is movable by and with the cap relative to the resistance element and the center terminal. As can be seen in FIGS. 2 and 4, the position of contact 54 on the resistance element can be varied by rotating cap 60 with the cap maintaining engagement of the contact between the center terminal and the resistance element. Cap 60 is made of a suitable resilient plastic material to bias the rolling contact into engagement between the center terminal and the resistance element and thereby maintain desired contact pressure.

A variable resistance constructed in accordance with this invention is assembled by sliding resistance plate 22 onto bushing 14 with key-hole portion 24 registering with bore 42 and slot 20. End leads 50 and 52 can be connected to the resistance element prior to or after assembly of the resistance plate as desired. Body 34, with center lead 40 thereon, is placed on the bushing with its projection 36 registering with slot 20 so that projection 38 is positioned in the area 32. Cap 60 and rolling contact 54 are assembled by snapping cap 60 onto flange portion 18 to complete the assembly of the variable resistance which can then be connected to a mounting panel 12 by nut 17. It will be noted that the mating slot of the bushing and projections of the resistance element and body connect these members in fixed relation and properly oriented one to the other. Furthermore, cap 60 will hold the elements together prior to mounting and, when mounted, tightening of nut 17 will hold the elements in assembled relationship.

Rotation of cap 60 will position rolling contact 54 along the resistance element as desired with projection 38 providing a positive indication when the contact has reached either end of its travel. As constructed in the preferred embodiment, projection 38 serves as a stop preventing movement of the contact beyond its ends.

However, projection 38 may be varied as illustrated in FIG. 8 where its height is reduced and it is provided with an upper concave face 70. Here the projection will function as an abutment to give an indication when the contact has reached either end of the resistance element and will additionally serve to position the ball completely out of contact with the resistance element. That is, continued rotation of the cap after the contact has reached either end of the resistance will snap the contact up onto the concave face where it will be held between the ends of the resistance. This provides for a more versatile device in that the contact can be moved between either end of the resistance without having to traverse the entire resistance. This is accomplished while maintaining a positive indication at the resistance ends and, furthermore, attributes snap-type on-off operation to the device. Since the only variation between the embodiments of FIG. 8 and FIGS. 1–7 lies in the modified projection 70, the elements of the alternative embodiment of FIG. 8 corresponding to the same elements of the embodiment of FIGS. 1–7 have been identified by prime numbers.

As compared to comparable prior art devices, a variable resistance device constructed in accordance with this invention incorporates relatively fewer parts with the parts being so constructed and arranged as to interlock one with the other such that they are readily assembled without the need for additional elements such as connecting screws, etc. and, when so assembled, are inherently connected in a desired relationship and relative orientation. Furthermore, desired contact pressure is provided without the use of auxiliary springs. Hence, a device of relatively simple and economical construction is provided and, further, one which is readily assembled.

Although this invention has been illustrated and described in connection with particular embodiments thereof, it will be apparent to those skilled in the art that various changes and modifications may be made therein without departing from the spirit of the invention or from the scope of the appended claims.

What I claim is:

1. A variable resistance comprising, in combination, an arcuate resistance element having its ends disposed in relative spaced relation, an insulating body adjacent said resistance element and including a projection positioned intermediate said ends of said resistance element, a plurality of terminal means, one of said terminal means extending around said insulating body generally coextensively and coaxially with said resistance element and two of said terminal means connected to said resistance element, a rolling contact engaged between said resistance element and said one terminal, a generally resilient cap, and means supporting said cap for rotation relative to said resistance element and with said cap in engagement with said rolling contact to effect movement of said rolling contact relative to said resistance element and one terminal means, said cap also supported to bias said contact into engagement between said resistance element and said one terminal means as said rolling contact is moved by said cap so that said cap maintains contact pressure between said rolling contact and said resistance element and said first terminal means and also provides the control element for said variable resistance.

2. The combination of claim 1 wherein said projection on said body includes a generally concave face for selectively receiving and positioning said rolling contact intermediate the ends of said resistance element.

3. The combination of claim 1 wherein said terminal means extend exteriorly of said variable resistance.

4. A variable resistance comprising, in combination, a bushing, a generally arcuate resistance element mounted on said bushing having its ends disposed in relative spaced relation, an insulating body adjacent said resistance element and including a projection positioned intermediate said ends of said resistance element, means on said body and said resistance element mating with means on said bushing for preventing relative rotational movement therebetween and to properly orient said body and resistance element with respect to said bushing, first electrically conductive means supported on said body and extending generally coextensively and coaxially with said resistance element, second electrically conductive means connected to said resistance element, a rolling contact engaged between said resistance element and said first conductive means, a generally resilient cap, and means supporting said cap for rotation relative to said resistance element and for engagement with said rolling contact to effect movement of said rolling contact relative to said resistance element and to bias said rolling contact into engagement between said resistance element and said first conductive means as said rolling contact is moved by said cap so that said cap maintains contact pressure therebetween and also provides the control element for said variable resistance.

5. A variable resistance comprising, in combination, a bushing having an elongated hollow portion and a flange portion, a generally arcuate resistance element mounted on said hollow portion adjacent said flange portion and having its ends disposed in relative spaced relation, an insulating body disposed on said hollow portion adjacent said resistance element and including a projection positioned intermediate said ends of said resistance element, means on said body and said resistance element mating with means on said bushing for preventing relative rotational movement therebetween, a plurality of terminal means, one of said terminal means supported on said body and extending generally coextensively and coaxially with said resistance element and two of said terminal means connected to said resistance element, a rolling contact engaged between said resistance element and said one terminal means, a generally resilient cap, and means supporting said cap for rotation relative to said flange portion and for engagement with said contact to effect movement of said contact relative to said resistance element, said cap also supported to bias said contact into engagement between said resistance element and said one terminal means as said contact is moved by said cap so that said cap maintains contact pressure therebetween and also provides the control element for said variable resistance.

6. The combination of claim 5 wherein said hollow portion is generally cylindrical and said mating means on said hollow portion comprises an axial slot therein, and said mating means on said resistance element and said body comprise a projection conforming to and disposed in said axial slot.

7. The combination of claim 6 wherein said cap includes an axially extending portion and a radially projecting portion engaging and biasing said rolling contact into engagement with said resistance element and said one terminal mears.

8. The combination of claim 5 wherein said projection of said body disposed intermediate the ends of said resistance element includes a generally concave face for receiving and positioning said rolling contact intermediate the ends of said resistance element.

9. The combination of claim 6 wherein said terminal means extend exteriorly of said hollow cylindrical portion.

10. A variable resistance comprising, in combination, a bushing including an elongated tubular portion and a generally circular portion extending radially of said tubular portion, a generally arcuate resistance supported on said tubular portion in coaxial relationship with and adjacent to said generally circular portion, generally arcuate electrically conductive means, means supporting said electrically conductive means adjacent to and in coaxial relationship with said resistance element, rolling contact means engaged between said resistance means and electrically conductive means, and a cap of resilient electrically insulating material including a first generally cylindrical portion engaging said circular portion for rotation thereon and extending from said circular portion in a generally axial direction across said resistance element and said rolling contact to a portion extending radially for engagement with and to bias said rolling contact into engagement with said resistance element and electrically conductive means, said rolling contact being engaged by and movable with said cap as said cap is rotated on said generally circular portion and in bridging relationship between said resistance element and said electrically conductive means.

11. The variable resistance of claim 10 wherein said resistance element has ends positioned in relative spaced relationship, and including an insulating body portion disposed on said tubular portion and including a projection positioned intermediate the ends of said resistance element to provide a stop at the extreme ends of travel of said rolling contact relative to said resistance element.

12. The variable resistance of claim 11 wherein said electrically conductive means is supported on said insulating body.

13. The variable resistance of claim 11 wherein said projection on said insulating body includes a generally concave face for receiving and positioning said rolling contact intermediate the ends of said resistance element.

References Cited by the Examiner
UNITED STATES PATENTS

| | | | |
|---|---|---|---|
| 1,433,740 | 10/1922 | Nagel | 338—184 X |
| 2,141,770 | 12/1938 | Solomon | 338—157 X |
| 2,451,241 | 10/1948 | Rosenstreter | 338—163 X |
| 2,514,682 | 7/1950 | Tellkamp | 338—163 |
| 2,576,044 | 11/1951 | Richman et al. | 338—184 X |
| 2,633,758 | 4/1953 | Hobson et al. | 74—553 |
| 2,694,127 | 11/1954 | Fearn | 338—157 X |
| 2,829,224 | 4/1958 | De Bell | 338—163 |
| 2,917,720 | 12/1959 | Budd | 338—154 |

FOREIGN PATENTS 450,549   7/1936   Great Britain.

RICHARD M. WOOD, *Primary Examiner.*